United States Patent [19]

Wilkinson

[11] Patent Number: 4,599,650
[45] Date of Patent: Jul. 8, 1986

[54] TELEVISION FRAME SIGNAL SYNCHRONIZING CIRCUITS

[75] Inventor: James H. Wilkinson, Basingstoke, United Kingdom

[73] Assignee: Sony Corporation, Tokyo, Japan

[21] Appl. No.: 607,765

[22] Filed: May 7, 1984

[30] Foreign Application Priority Data

May 18, 1983 [GB] United Kingdom ............ 8313780

[51] Int. Cl.$^4$ ............................................. H04N 5/04
[52] U.S. Cl. ............................ 358/148; 358/149; 375/106
[58] Field of Search ............ 358/148, 149, 150, 153, 358/158, 337, 319, 320; 370/100, 103, 105; 375/106, 108, 109, 111

[56] References Cited

U.S. PATENT DOCUMENTS 3,413,414 11/1968 Baldwin et al. ............ 358/149
4,203,135 5/1980 Sasaki ......................... 358/149
4,231,063 10/1980 Ito et al. ...................... 358/148

*Primary Examiner*—James J. Groody
*Assistant Examiner*—Michael D. Parker
*Attorney, Agent, or Firm*—Lewis H. Eslinger; Alvin Sinderbrand

[57] ABSTRACT

A television frame signal synchronizing circuit comprises a presettable cyclic counter and a maximum count detector, a clock pulse generator for supplying clock pulses to the counter, a store for storing the count of the counter, and a source of reference frame pulses to which input frame pulses are to be synchronized, each reference frame pulse causing the count stored in the store to be loaded into the counter. A television signal processor is capable of adjusting the timing of television signals passed therethrough in dependence on a reverse frame pulse, the carry signals from the counter forming reverse frame pulses for supply to the television signal processor for adjusting the phase of the television signal passed therethrough, the television signal including the input frame pulses at least some of which are derived and supplied to the store which thereupon stores the count of the counter. The phase of the television signal is therefore adjusted until the input frame pulses are in synchronism with the reference frame pulses.

6 Claims, 4 Drawing Figures

TELEVISION FRAME SIGNAL SYNCHRONIZING CIRCUITS

BACKGROUND OF THE INVENTION

1. Field of the Invention

This invention relates to television frame signal synchronizing circuits.

2. Description of the Prior Art

In our copending UK patent application No. 8306606 (U.S. Application Ser. No. 582,627) there is described a television signal processing apparatus comprising a plurality of digital television signal processors connected in series between an analog-to-digital converter which converts an input television signal to digital form, and a digital-to-analog (D/A) converter for converting the digital signal back to analog form. At least one of the signal processors is capable of frame synchronizing the digital television signal in dependence on a frame pulse supplied to that signal processor, and a circuit is associated with the D/A converter for producing the frame pulse and for feeding it back to that signal processor. This circuit also operates to synchronize the frame pulse which it produces relative to a source of system television synchronizing signals so that the frame synchronizing signal processor adjusts the timing of the input digital television signal to the D/A converter to bring the output analog television signal into the required synchronism with the system television synchronizing signals.

The present invention is concerned with a television frame signal synchronizing circuit which is particularly suitable for use as the circuit for producing a frame pulse in an apparatus as outlined above.

SUMMARY OF THE INVENTION

One object of the present invention is to provide a television frame synchronizing circuit for producing a frame pulse for frame synchronizing a television signal.

Another object of the present invention is to provide a television frame synchronizing circuit for synchronizing input television frame pulses to a source of reference frame pulses.

Another object of the present invention is to provide a television frame synchronizing circuit for adjusting the timing of a television signal relative to a reference.

According to the present invention there is provided a television frame signal synchronizing circuit comprising:
- a presettable cyclic counter;
- a clock pulse generator for supplying clock pulses to said counter;
- a store for storing the count of said counter;
- a source of reference television frame pulses to which input television frame pulses are to be synchronized, each said reference frame pulse causing the count stored in said store to be loaded into said counter; and
- a television signal processor capable of adjusting, in dependence on a reverse television frame pulse, the timing of a television signal passed therethrough, the carry signals from said counter forming said reverse television frame pulses for supply to said television signal processor which thereupon adjusts the timing of said television signal passed therethrough, said television signal including said input television frame pulses, and at least some of said input frame pulses being derived and supplied to said store which thereupon stores the count of said counter;
- the arrangement being such that the timing of said television signal is adjusted to bring said input frame pulses into synchronism with said reference frame pulses.

The above, and other objects, features and advantages of this invention will be apparent from the following detailed description of illustrative embodiments which is to be read in connection with the accompanying drawings.

DESCRIPTION OF THE PREFERRED EMBODIMENTS

Before describing the embodiment, and to assist understanding thereof, the time constraints affecting an analog television signal and a digital television signal will first be discussed.

When a moving picture is sampled to form an analog television signal, the requirement for synchronization is introduced, and this is achieved by providing line, field and frame synchronizing signals. The time constraints on these synchronizing signals are very severe. If the analog television signal is then sampled to form a digital television for digital processing, the time constraints become different. The number of samples in each video scanning line and the relative timings of the samples must be precise, but after sampling, the time constraints may be relaxed, because each sample can be uniquely identified in terms of its position relative to a digital line synchronizing signal and a digital frame synchronizing signal. In other words, the position of a sample can be determined merely by counting samples. Any system which is to process the digital television signal can achieve the required timing accuracy, so long as the following conditions are met:

(1) The data signal to be processed must contain selected words indicating a digital frame synchronizing signal and a complete set of digital line synchronizing signals.

(2) The frame must contain a total complement of active samples, that is, samples containing picture information.

(3) The synchronizing signals must have the correct relative phase with respect to the active samples.

(4) The signal to be processed must contain and retain all the ancilliary user information, teletext if required, and all the required control and identification information, the precise form of this information depending on the particular system.

(5) The time separation of the digital frame synchronizing signals must be nominally equal to the analog frame period.

When a digital television signal has been processed in one or more digital processors, then inevitably some delay will have been introduced. Subsequent to the digital processing, therefore, it is necessary to effect resynchronization relative to some system television synchronizing signals when the digital television signal is re-converted to analog form at a D/A converter which follows the digital processors.

As described in our above-mentioned copending patent application, the effect of this is that the clock signals used in the digital processors do not need to be locked to the synchronizing signals of the analog television signal, which considerably simplifies the design and implementation of the digital processors.

The embodiment of the present invention now to be described is particularly concerned with a television frame signal synchronizing circuit for producing a frame signal for use in re-synchronization of a system as described above.

Figure 1:
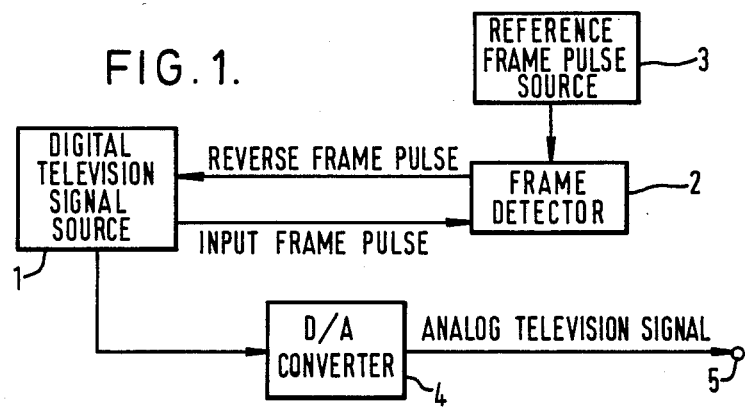
FIG. 1 shows in block diagrammatic form part of a television signal processing apparatus.

Referring now to FIG. 1, a digital television signal source 1 comprises a plurality of digital television signal processors connected in series, at least one of the signal processors being capable of frame synchronizing the digital television signal passing therethrough, in dependence on reverse frame pulses supplied to the digital television source 1 by a frame detector 2. The frame detector 2 derives the reverse frame pulses in dependence on reference frame pulses received from a reference frame pulse source 3, and input frame pulses derived from the digital television signal at the output of the digital television signal source 1. The signal processor which effects the frame synchronizing of the digital television signal in the digital television source 1 may be a time-base corrector or some other signal processor which incorporates digital television signal storage, such as a field or frame store.

The digital television signal source 1 also supplies the output digital television signal to a D/A converter 4 which derives from the digital television signal an analog television signal for supply to an output 5. For reasons which will be explained later, the D/A converter 4 will normally have some limited time base correction capability.

The frame detector 2 and the reference frame pulse source 3 of FIG. 1 will now be described in more detail with reference to FIG. 2.

The reference frame pulses supplied by the reference frame pulse source 3 form the load signals for a presettable cyclic (M+1) clock counter 10 with an n-bit output, where n is the number of bits required to represent the M+1 clock cycles. A maximum count detector 9 clears the counter 10 when the count value M is reached. The counter 10 is clocked by clock pulses supplied by a clock pulse generator 11. The clock pulse generator 11 is preferably a synchronous crystal oscillator locked to the reference frame pulse or an asynchronous crystal oscillator with an accuracy of say 1 in $10^5$. The n-bit output of the counter 10 is supplied to a store in the form of an n-bit wide flip-flop circuit 12, the n-bit output of which is fed back to the input of the counter 10. The input frame pulses are supplied by way of an input 13 to a divider 14 which selects one out of every m input frame pulses for supply to a clock terminal of the flip-flop circuit 12, while the carry outputs of the counter 10 are supplied to an output terminal 15 and form the reverse frame pulses.

The reference frame pulses are also supplied to a delay circuit 16, the output of which is connected to the clock input of a D-type flip-flop circuit 17. The input frame pulses are also supplied to a window circuit 18, the output of which is supplied to the D input of the flip-flop circuit 17. The output of the flip-flop circuit 17 is supplied to a lock indicator 19.

As will now be described with reference also to FIG. 3, the circuit of FIG. 2 operates to synchronize the input frame pulses with the reference frame pulses by shifting the reverse frame pulses, which cause a signal processor in the digital television signal source 1 (FIG. 1) to shift the input frame pulses until the required synchronism is achieved. This shifting of the reverse frame pulses is applied using one in m of the input frame pulses are selected by the divider 14. The value of m is typically four or eight and is chosen so as to allow the digital television signal source 1 (FIG. 1) time to stabilise after each shift.

The clock pulse generator 11 generates clock pulses at M+1 times the frequency of the reference frame pulses. On supply of the leading edge of a reference frame pulse 20 (FIG. 3A), to the load terminal of the counter 10, the counter 10 loads the n-bit number then being supplied by the flip-flop circuit 12 and continues counting the clock pulses from that number. As indicated in FIG. 3B, it is assumed that the number loaded is X. When the count in the counter 10 reaches the maximum count M, the output from the maximum count detector 9 is supplied to the output terminal 15 and forms a reverse frame pulse 21 (FIG. 3C).

The count of the counter 10 is also continuously supplied to the flip-flop circuit 12, but is only clocked into the flip-flop circuit 12 on receipt of the leading edge of an input frame pulse 22 (FIG. 3D). It is assumed that the input frame pulse 22 occurs when the count of the counter 10 is X+Y. Thus, on receipt of the next reference frame pulse 23 (FIG. 3A), the count loaded into the counter 10 is X+Y, and hence the time for the counter 10 next to reach the maximum count M will be reduced by the time corresponding to Y clock pulses. The next carry signal, that is to say the next reverse frame pulse 24 (FIG. 3C) will therefore be earlier by a time corresponding to Y clock pulses. This means that the next input frame pulse 25 will be earlier by a time corresponding to Y clock pulses, so that the required synchronization is achieved. Thus, the circuit is stable only when the input frame pulses are in synchronism with the reference frame pulses, and as a result the count loaded by the flip-flop circuit 12 into the counter 10 is the same as the current count of the counter 10. Thus if the count of the counter 10 is Z when the load pulse occurs, the load count will also be Z, and as a result the output of the counter 10 will continue as if no change had occurred. Hence the timing of the carry output will not change.

As indicated in FIG. 1, the reverse frame pulses are fed back to the digital television signal source 1 to effect the required shifting of the input frame pulses. For example, the reverse frame pulses may be fed back to a signal processor comprising a frame store, and the reverse frame pulses may form the synchronizing signals which initiate read out of the frame store.

In a particular example of the above embodiment, n is sixteen, M is 65535 and the frequency of the clock pulse signal generator 11 is 1.6384 MHz, that is to say, $2^{16} \times 25$ Hz, which is $2^{16}$ times the frame frequency of a 25-frame/second television system. The clock period is therefore 610 nanoseconds, and this is the accuracy with which the input frame pulses can be synchronized to the reference frame pulses. If more perfect synchronisation of the output analog television signal (FIG. 1) is required, then the frequency of the clock pulse generator 11 can be increased or the D/A converter 4 can have associated with it a time-base corrector capable of correcting the timing by up to say 2 microseconds, that is to say slightly in excess of plus or minus 610 nanoseconds.

In another example of the above embodiment, M is 539999, n is 20 and the frequency of the clock signal pulse generator 11 is 13.5 MHz, that is, the luminance sampling frequency of a CCIR 601 digital video signal. The clock period is 74 nanoseconds and synchronous with the sampling clock signal of the D/A converter 4. In this case, any time-base correction in the D/A converter 4 can be made small, for example plus or minus 74 nanoseconds (or one clock).

Figure 2:
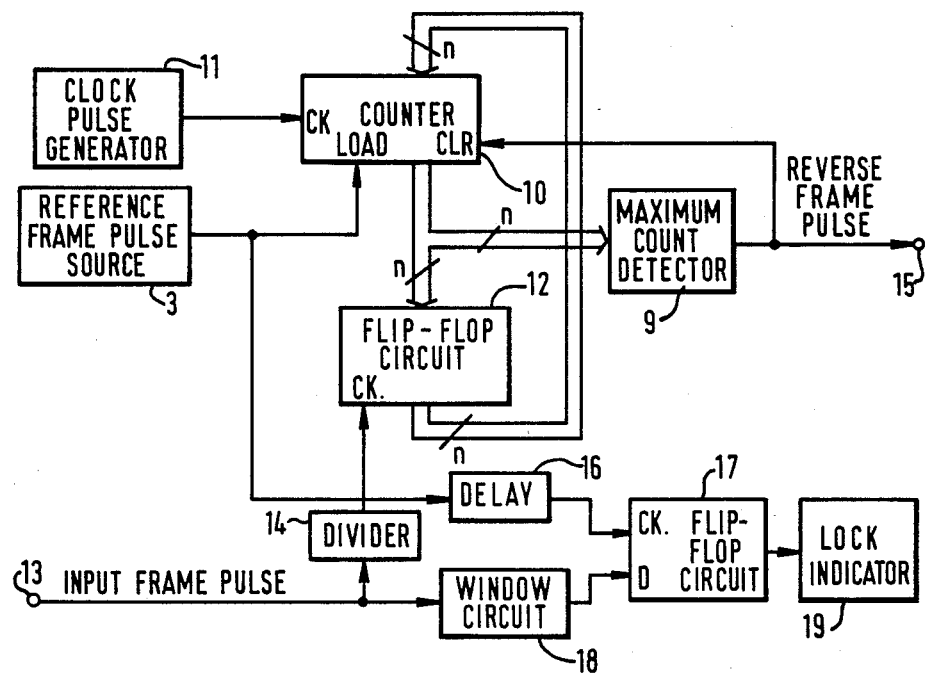
FIG. 2 shows in block diagrammatic form an embodiment of television frame signal synchronizing circuit according to the invention.
Figure 3:
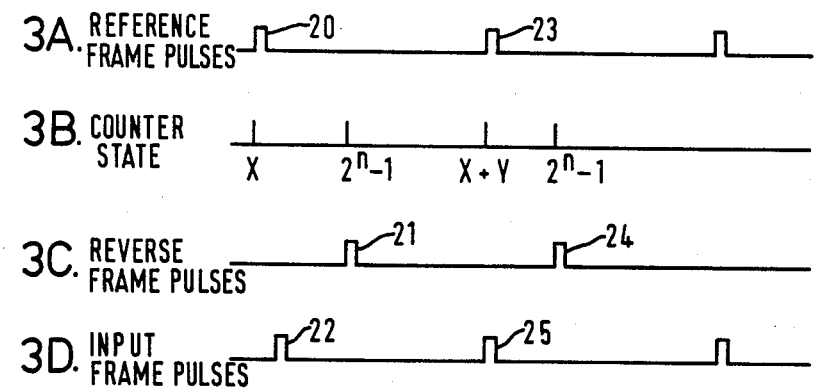
FIG. 3 shows waveforms used in describing the operation of the circuit of FIG. 2.
Figure 4:
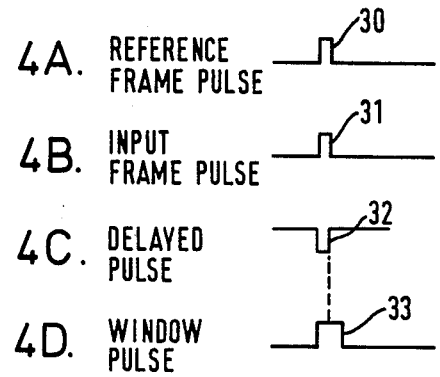
FIG. 4 shows further waveforms used in describing the operation of the circuit of FIG. 2.

Referring now to FIGS. 2 and 4, the lock indicator 19, which can, for example, comprise a light emitting diode, provides an indication when the required synchronization between the input frame pulses and the reference frame pulses has been achieved. FIGS. 4A and 4B show a reference frame pulse 30 and an input frame pulse 31 respectively, while FIG. 4C shows a negative pulse 32 which forms an output of the delay circuit 16. The leading edge of the pulse 32 conicides with the leading edge of the reference frame pulse 30. FIG. 4D shows a window pulse 33 which is the output of the window circuit 18 and the leading edge of which coincides with the leading edge of the input frame pulse 31. The flip-flop circuit 17 operates to supply an output signal to operate the lock indicator 19 when the trailing edge of the pulse 32 is positioned within the duration of the window pulse 33.

Various modifications are of course possible. For example, in the above description it was assumed that the clock pulse signal generator 11 is asynchronous, that is to say is not synchronized to the reference frame pulses, but as an alternative the clock pulse signal generator 11 can be synchronized to the reference frame pulses, for example by incorporating a suitable phase-lock loop circuit.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A television frame signal synchronizing circuit comprising:
   a presettable cyclic counter;
   a clock pulse generator for supplying clock pulses to said counter;
   a store for storing the count of said counter;
   a source of reference television frame pulses with which input television frame pulses are to be synchronized, each of said reference frame pulses causing the count stored in said store to be loaded into said counter; and
   a television signal processor capable of adjusting, in dependence on a reverse television frame pulse, the timing of a television signal passed therethrough, carry signals from said counter forming said reverse television frame pulses for supply to said television signal processor which thereupon adjusts the timing of said television signal passed therethrough, said television signal including said input television frame pulses, and at least some of said input frame pulses being derived and supplied to said store which thereupon stores the count of said counter; the arrangement being such that the timing of said television signal is adjusted to bring said input frame pulses into synchronism with said reference frame pulses.

2. A circuit according to claim 1 wherein said counter is an M+1 counter, and said clock pulse generator supplies clock pulses at a frequency of M+1 times the frame frequency of said television signal.

3. A circuit according to claim 2 wherein said store is an n-bit flip-flop circuit.

4. A circuit according to claim 1 further comprising a divider which derives one in four or eight of said input frame pulses for supply to said store.

5. A circuit according to claim 1 wherein said clock pulse generator is a crystal controlled oscillator.

6. A circuit according to claim 1 wherein said clock pulse generator comprises a phase-locked loop whereby said clock pulse generator is locked in phase and frequency to said reference frame pulses.

* * * * *